United States Patent [19]

Gutowski

[11] Patent Number: 4,766,656

[45] Date of Patent: Aug. 30, 1988

[54] APPARATUS FOR SECURING METAL TABS TO FILE UNIT BODIES

[76] Inventor: Richard W. Gutowski, 424 Oakton Ave., Pewaukee, Wis. 53072

[21] Appl. No.: 71,198

[22] Filed: Jul. 8, 1987

[51] Int. Cl.[4] .................... B23D 23/04

[52] U.S. Cl. .................... 29/33 K; 29/34 B; 29/243.52; 29/512; 29/788; 29/809; 227/27; 227/57

[58] Field of Search .................... 29/243.52, 512, 513, 29/809, 788, 33 K, 34 B; 227/27, 59, 15, 16, 18, 57

[56] References Cited

U.S. PATENT DOCUMENTS

| | | | |
|---|---|---|---|
| 1,715,812 | 6/1929 | Bauer | 29/33 K |
| 1,931,155 | 10/1933 | Pearce | 227/16 X |
| 2,122,557 | 7/1938 | Canter | 29/243.52 X |
| 3,150,790 | 9/1964 | Beneteau | 227/15 |
| 3,257,715 | 6/1966 | Luther | 29/788 X |
| 3,699,633 | 10/1972 | Kidd | 29/788 X |
| 4,571,797 | 2/1986 | Bergamaschi | 29/33 K |
| 4,700,449 | 10/1987 | Chapman | 29/33 K X |

FOREIGN PATENT DOCUMENTS

| | | | |
|---|---|---|---|
| 502635 | 12/1954 | Italy | 29/243.52 |

*Primary Examiner*—Charlie T. Moon

*Attorney, Agent, or Firm*—James E. Nilles; James R. Custin

[57] ABSTRACT

A table supports a cardboard file unit body as it is manually slid edgewise forwardly, engaged against a fixed but adjustable side edge guide, into engagement with a fore-and-aft movable front edge guide and an air microswitch thereon that actuates a punch mechanism. After punch operation, the front edge guide moves forward, bringing the punched portion of the body between the wings of a metal tab waiting at a peening station. Arrival of the front edge guide at its forward position trips another air microswitch to actuate a tab peening mechanism. The tabbed body is then manually withdrawn rearwardly and a new tab is automatically fed rearward to the peening station from a stack of tabs in front of that station. The punching and peening mechanisms, front edge guide and tab feed slider are actuated pneumatically.

6 Claims, 8 Drawing Sheets

APPARATUS FOR SECURING METAL TABS TO FILE UNIT BODIES

FIELD OF THE INVENTION

This invention relates to apparatus for fastening metal indicia-carrier tabs to file unit bodies such as file folders and file guides of pressboard or the like; and the invention is more particularly concerned with apparatus that rapidly and accurately performs the steps of punching a file unit body with holes for receiving preformed eyelets of a metal tab, bringing the punched body and a tab into accurately assembled relationship to one another, and peening the eyelets of the tab to rivet it to the body.

BACKGROUND OF THE INVENTION

The term "file units" is used herein to denote both file folders and card-like file guides that are inserted between groups of file folders to subdivide them for quick location of a desired file folder. The body of such a file unit, which is usually of pressboard or a similar cardboard-like material, is provided with a tab which projects from one of its edges and which carries identifying indicia. On file units used for drawer filing, the tab projects from a long edge of the body that will be uppermost in a drawer; on those used for shelf filing the tab projects from a shorter side edge. Where several tabbed units are installed in a bank of files, no tab should be directly in front of another, and therefore file units are usually made available in sets that have tabs at several different locations along their tabbed edges.

The type of file unit tab here under consideration is formed from one piece of thin sheet metal that is bent to a narrow U-shape to have a pair of flatwise opposing wings which overlie opposite surfaces of a file unit body and which are connected by a bight portion of the tab that defines a folded edge thereof. Adjacent to its folded edge each wing of the tab has a slot therethrough, and the slotted portion of the tab projects beyond the tabbed edge of a file unit body to which the tab is secured. A label or the like, inserted into the channel defined by this projecting portion of the tab, is visible through the slots. For its securement to a file unit body the tab is made with preformed eyelets in the portions of its wings that overlie the file unit body, the eyelets in one wing being formed as short, tubular rivets that can pass through punched holes in the body and be peened into engagement with the rims of the eyelets in the other wing.

Heretofore the securement of such metal tabs to file unit bodies has been accomplished mainly with manual operations. At one machine each body was punched with holes that were to receive the rivet eyelets of a metal tab. A tab was then manually preassembled to the body with its eyelets engaged in the punched holes, and the rivet eyelets were peened at another machine.

This procedure was obviously slow. The usual rate of production was on the order of six units per minute. In an effort to increase this production rate, a machine has heretofore been constructed that was intended to transfer tabs one-by-one from a storage location to a peening location where a previously punched file unit body was manually introduced between the wings of the tab and where a peening operation was then performed that secured the tab to the body. This machine did not operate successfully. Because the file unit bodies had been punched at another machine, problems arose with respect to bringing the file unit bodies to positions at which their holes were in accurate register with eyelets in a tab at the peening station. The mechanism for transferring tabs from the storage station to the peening station also gave rise to problems. That mechanism comprised a claw which engaged in the slot in one of the wings, and because of the thin metal of which such tabs are made, the claw was quickly abraded to the point where it could not accurately position the tabs at the peening station.

Considering the high degree of automation attained in the manufacture of more complex products, the amount of hand labor heretofore employed in file body tabbing suggests that a relatively low level of skill has been applied to the design of equipment for that operation. However, as exemplified by the difficulties encountered with the above discussed prior machine, the design of reliable apparatus for materially expediting the tabbing operation requires satisfactory solution of each of a number of problems, and it may well be that it is not so much lack of skill that has blocked the attainment of these solutions as the intractable nature of the problems themselves.

A major problem is that a satisfactory tabbing machine must be low in cost. To justify the investment in such a machine, it must displace a certain amount of hand labor. But the labor that it displaces is unskilled and therefore not well paid. Furthermore, sales volumes and selling prices also tend to impose economic limits o the value of a machine that will achieve a given rate of production.

For a tabbing machine to be inexpensive it must also be simple. Nevertheless, it must be very versatile, capable of tabbing file unit bodies of different shapes and sizes and of applying tabs of various shapes and sizes at various locations along the tab edges of such bodies; and it should be possible for relatively unskilled persons to adjust it quickly, easily and accurately to accommodate these several variables. Obviously, the machine should require an absolute minimum of maintenance and repair.

On the basis of economic considerations, complete automation of a file body tabbing machine does not seem to be justified. This means that file bodies will be manually fed into such a machine and removed from it. Since punching and peening operations present a high potential for serious injury, a tabbing machine must be so constructed and arranged that its operator cannot come into contact with its moving parts. From a safety standpoint it is also desirable that there be no electrical connections to the machine.

For manual infeed and withdrawal of file bodies to be fast, simple and efficient, there should be no need for the operator to devote special attention, or to exercise special skill, in accurate placement of the file bodies as they move into the machine, and the operator should not have to manipulate any control device that initiates or terminates an operation performed by the machine.

Fast and satisfactory operation of a tabbing machine requires that every file unit body be quickly and accurately brought into such relationship with a tab that a tab edge portion of the body is disposed between the tab wings. Although the wings of an unattached tab diverge slightly from its folded edge, the space between the wings is relatively narrow, and the file body must enter that space instead of passing to one side or the other of the tab, and as it does so its tab edge cannot be permitted to hang up on the rivet eyelets. Establishing the preassembled relationship is complicated by the thin, springy metal of which the tab is made and, to a greater extent, by the tendency for pressboard file unit bodies to warp markedly out of flatness, especially in damp weather.

A further consideration, which may be very important in some installations, is that a tabbing machine occupy a minimum of floor space.

SUMMARY OF THE INVENTION

The general object of the present invention is to provide a machine for punching file unit bodies and securing metal tabs to them, which machine satisfies all of the requirements and desiderata pointed out above.

Thus, it is an object of the invention to provide a simple, reliable, efficient and inexpensive machine for applying metal tabs to file unit bodies and file folder bodies of pressboard or the like, said machine being semi-automatic in that an operator feeds each body edgewise forwardly to a location in the machine at which the body is punched, maintains a light edgewise forward force on the body while the machine controls its movement from that location to a location at which it is preassembled with a tab and the tab is peened, and then withdraws the body edgewise rearwardly from the machine.

Another and more specific object of the invention is to provide a compact, inexpensive and fast-operating machine for securing metal tabs to file unit bodies that is safe for the operator, having its moving parts well guarded from contact with the operator and requiring no electrical connections that could give rise to shock hazards.

A further and very important obJect of this invention is to provide an efficient and very versatile file unit tabbing machine, capable of being quickly and easily adjusted for installing metal tabs of any of a wide variety of shapes and sizes on any of a wide variety of file guide bodies and file folder bodies, at any desired location along any edge of such a body.

It is also a specific object of this invention to provide a file unit tabbing machine which punches tab eyelet holes in a file unit body, then provides for the body and a metal tab to be brought into accurate preassembled relationship with preformed eyelets in the tab in accurate register with the punched holes, and thereafter peens the eyelets without further shifting of the body or the tab to assure neat and secure attachment of the tab to the body.

A further object of the invention is to provide a simple and inexpensive file unit tabbing machine which requires practically no maintenance and which can operate steadily for long periods of time without need for repair or replacement of any part.

The ultimate objective of this invention, as indicated above, is to increase the rate of production of metal tabbed file units while reducing the cost of labor for such production, and the extent to which the invention achieves that objective is apparent from the fact that an operator working with the machine of this invention can tab on the order of 24 file units per minute, as compared to a rate of about 6 per minute for a capable operator working with the best equipment heretofore available.

These and other objects of the invention that will appear as the description proceeds are acheived with apparatus for securing metal indicia tabs to file unit bodies of pressboard or the like, each said body having a tab edge at which a tab is to be secured and another edge which extends transversely to said tab edge, and each said tab being bent to a substantially U-shape to have a pair of flatwise opposing wings which are adapted to overlie opposite surfaces of a body and which are connected by a bight portion of the tab that defines a folded edge thereof, each said wing having eyelets spaced from said folded edge that provide for securement of the tab to a body by a peening operation. The apparatus of this invention is characterized by a frame that defines a peening station, an upwardly facing table surface on which a file unit body is edgewise slidable in a forward direction towards the peening station and an opposite rearward direction, and an upwardly facing tab supporting surface at a storage station that is spaced in said forward direction from the peening station. There is an elongated, upright tab storage guide on the frame, at the storage station, for supporting a plurality of tabs in a stack whereof a lowermost tab rests on the tab supporting surface and wherein each tab has an upper wing and a lower wing and has its folded edge facing in said forward direction. The tab storage guide has a bottom edge which is spaced above the tab supporting surface by a distance to be clear of said lowermost tab and is arranged to engage edge portions of all tabs thereabove to confine them to downward translation. A tab pusher, movable on the frame alternately in the forward direction and the rearward direction, has an abutment which faces in the rearward direction and which, during its rearward motion, engages the folded edge of the lowermost tab at the storage station to translate it to the peening station. A tab positioning element on the frame, at the peening station, has a top suface whereon a lower wing of a tab translated to the peening station is flatwise supportable and has abutment means projecting above its top surface for engagement by that lower wing to cooperate with the pusher in positioning that tab at the peening station. Peening means on the frame comprises downwardly projecting peening pins, a reaction element at the peening station that has a downwardly facing surface which opposes said top surface on the tab positioning element and which is engageable by the top wing of a tab at the peening station and further comprises peening tool members confined to substantially up and down movement relative to the frame and cooperable with one of said elements for performing the peening operation on eyelets of a tab at the peening station. Side guide means on the frame, projecting above the table surface and engageable by said other edge of a body thereon, guides that body for forward motion by which its tab edge portion is carried between the wings of a tab positioned at the peening station, for securement of that tab to the body by performance of said peening operation.

Preferably the apparatus also has punching means, at a punching station on the frame that is spaced in the rearward direction from the peening station, comprising a punching element confined to up and down motion relative to the frame for punching eyelet receiving holes in a body on the table surface. The apparatus also has locator means on the frame, comprising an element having a position in which a rearwardly facing abutment thereon is engageable by the tab edge of a body on the table surface that is urged in the forward direction to define for the body a punching location at which its tab edge portion is at the punching station for the punching of eyelet receiving holes therein, said element being movable relative to the frame from said position to another position for permitting the body to slide from the punching location to a peening location which is also defined by the locator means and at which said holes are in register with eyelets of a tab at the peening station.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

General Arrangement and Operation of the Machine

Figure 1A:
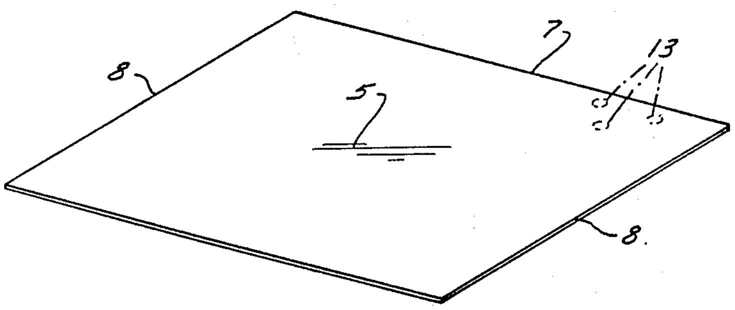
FIGS. 1*a*–*1h* schematically show the sequence of operations performed by the machine of this invention.

A file unit body 5 (FIG. 1*a*) upon which a metal tab 6 is to be secured by means of a machine of this invention may be a flat file guide body or a file folder, but in either case it is made of pressboard or a similar cardboard-like material and is generally rectangular, having one edge 7 to which a tab is to be secured, hereinafter referred to as its "tab edge", and having a pair of other edges 8 which extend transversely to the tab edge 7 and which are sometimes hereinafter referred to as "side edges". The tab 6 is bent from a single piece of thin sheet metal to a narrow U-shape, to have a bight portion 9′ which defines a folded edge 9 of the tab and to have a pair of flatwise superimposed wings 10, 10′ that are connected by the bight portion 9′. Adjacent to the folded edge 9 of the tab each of its wings 10, 10′ has a slot 11 which provides a window for indicia on a strip-like label or the like (not shown) that can be inserted between the wings. Spaced from the slot 11, at the side thereof remote from the folded edge 9, each wing has a plurality of preformed eyelets 12, the eyelets 12′ in the wing 10′ being in the form of tubular rivets that can pass through the eyelets in the other wing 10 and be peened into engagement with their rim portions.

Figure 1B:
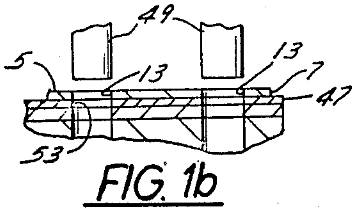
Figure 1C:
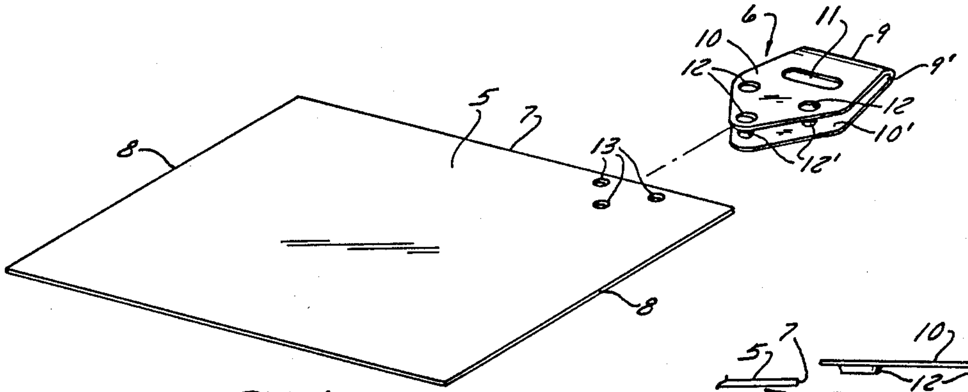
Figure 1D:
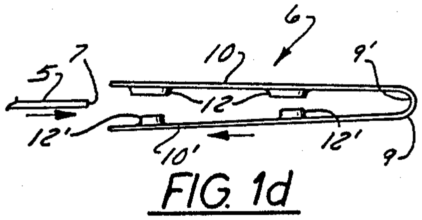
Figure 1E:
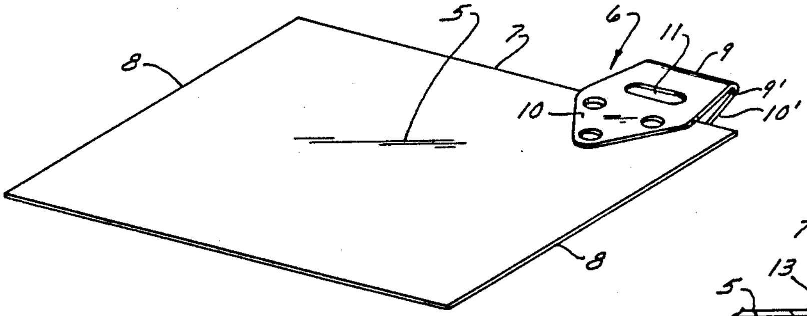
Figure 1F:
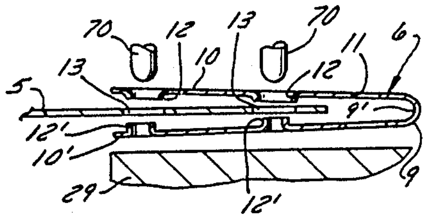
Figure 1G:
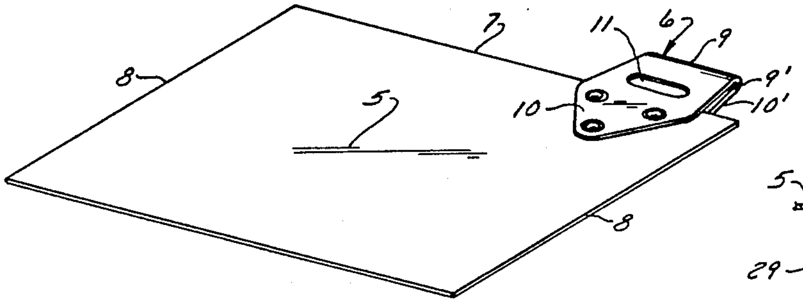
Figure 1H:
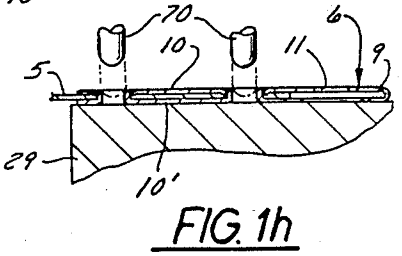
Figure 2:
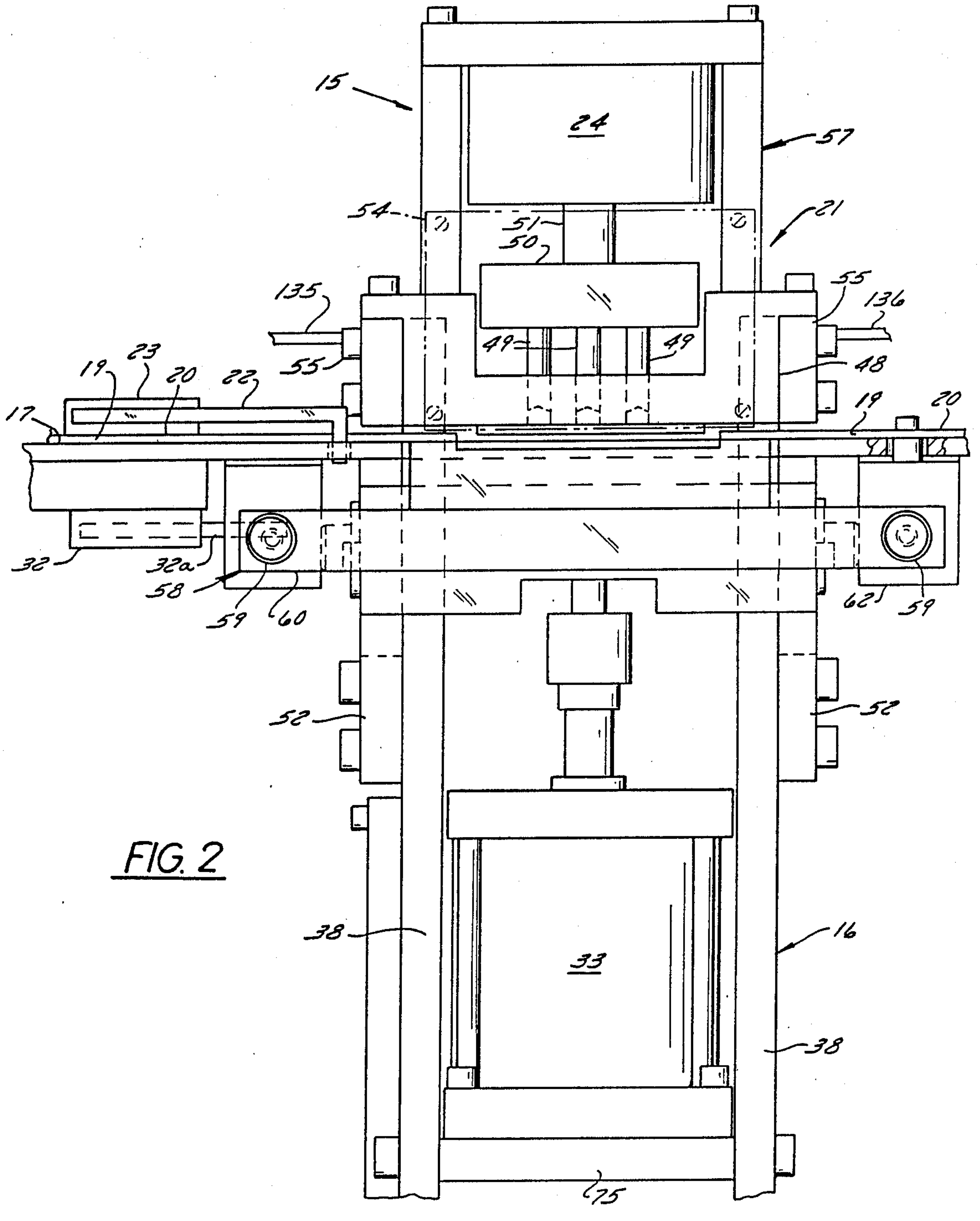
FIG. 2. is a view in elevation of the machine as seen from the rear thereof.

For assembling the tab 6 to the file unit body 5, the body is first punched (FIGS. 1*b*–1*c*) with holes 13 adjacent to its tab edge 7 through which the rivet eyelets 12′ of the tab can extend. The tab and the body are then brought (FIGS. 1*c*–1*f*) into an assembled relationship such that the tab edge portion of the body is between the wings 10, 10′ of the tab and the punched holes 13 are in register with the tab eyelets 12. The process is completed by peening the rivet eyelets 12′ (FIGS. 1*g*–1*h*).

Figure 3:
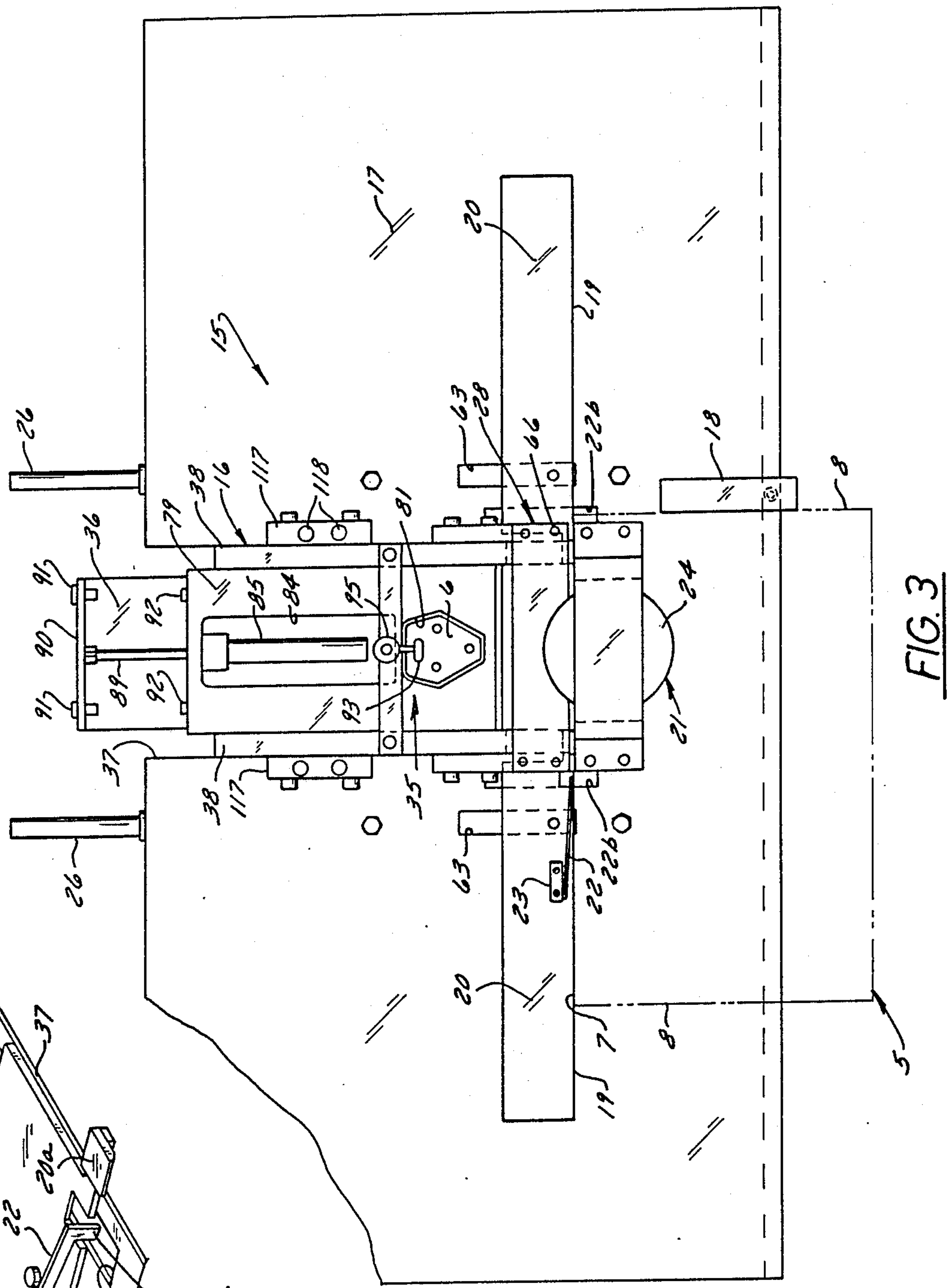
FIG. 3 is a plan view of the machine.
Figure 6:
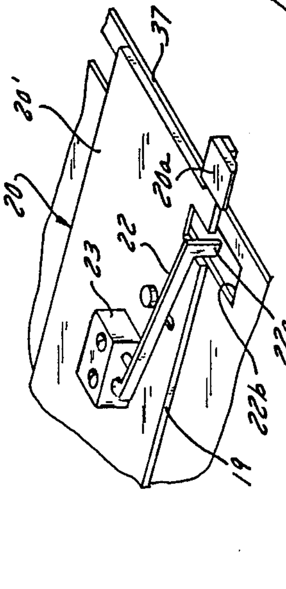
FIG. 6 is a fragmentary perspective view of a portion of the front edge guide and the air microswitch thereon, shown in relation to the table plate.
Figure 5:
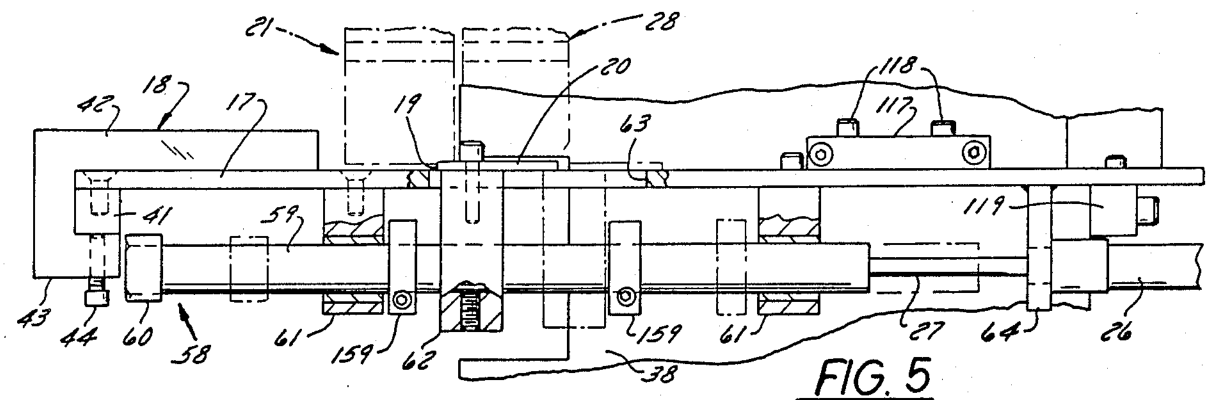
FIG. 5 is a fragmentary view, partly in side elevation and partly in vertical section, showing the table and the locator means.

A machine 15 of this invention for performing the tabbing process just described comprises a sturdy frame 16 on which is mounted a table plate 17 that has an upwardly facing table surface at a height above floor level which is convenient to an operator, preferably a seated operator. The operator slides a file unit body edgewise in a forward direction along this table surface, with the tab edge 7 of the body leading and with one of its side edges 8 slidingly engaging a-side guide 18 (FIGS. 3 and 5) that projects above the table surface and serves to constrain the body to forward and rearward translatory motion. Depending upon the operator's preference, there may be a second side guide on the-table, spaced from the first by a distance such that the body can be closely received between them so that they engage both side edges 8 of the body and thus positively confine it to forward and rearward sliding motion.

As the body is slid in the forward direction, its tab edge 7 comes into engagement with a rearwardly, facing abutment edge surface 19 on a plate-like front guide 20 which stops forward motion of the body to establish it in the proper location to be punched by a punching mechanism 21 that is described hereinafter. As the tab edge of the body comes into engagement with the front guide 20, it also engages the actuator arm 22 of an air microswitch 23 that controls operation of a pneumatic cylinder 24 by which the punch is actuated. The punchings produced by the punching operation fall into a funnel-like collector 25 which is detachably fixed to the frame 16 beneath the punch mechanism and which guides them into a suitable receptacle (not shown) on the floor beneath the table.

The front guide 20 is slidable back and forth between a rear position in which it establishes a file unit body in its punching location, as just described, and a front position to which it is pushed under the forward bias that the operator exerts on a body engaged against it and at which it establishes that body in a peening location. The front guide is actuated in the rearward direction for return to its punching position by means of a pair of air cylinders or air springs 26 which are mounted with their axes laterally spaced apart and parallel to one another and with their piston rods 27 projecting rearwardly. During the punching operation, which takes place in less than a second, the air springs 26 are pressurized and their piston rods remain extended, so that the air springs resist the forward bias that the operator continues to apply to the file body, and they thus maintain that body in the punching location.

When the pneumatic cylinder 24 of the punch mechanism 21 has operated through a cycle consisting of a downward punching stroke and an upward return stroke, pressure in the air springs 26 is relieved so that the file unit body 5 and the front guide 20 can move forward under operator bias, retracting the air spring pistons until the front guide reaches its front position.

At the peening location thus established for the body, its punched portion is at a peening mechanism 28 that comprises a peening platen 29. As the body moves into this peening location, a tab 6 to be assembled to it is already positioned on the top surface of the peening platen 29, with the wings 10, 10' of the tab projecting in the rearward direction and disposed at such levels that the tab edge portion of the body enters the gap between the wings. At the peening location, the punched holes 13 in the body are in accurate register with the eyelets 12 in the tab.

The peening mechanism 28, which is spaced in the forward direction from the punching mechanism 21, comprises a pneumatic peening cylinder 33 that is mounted on the frame 16 beneath the platen 29 and has its upwardly projecting piston rod 34 connected with the platen. As explained hereinafter, arrival of the body at its peening location actuates another air microswitch 32 that controls the peening cylinder 33, energizing that cylinder with compressed air to move the platen 29 upward in a peening stroke and downward in a return stroke. When the peening cylinder 33 completes its cycle, air is again charged into the air springs 26, which gently but firmly drive the front guide 20 rearward to the punching position at which the body first engaged it. As soon as the peening operation is completed, the operator can draw the finished unit rearwardly off of the table and then insert a new body forwardly into engagement with the front guide for a repetition of the process.

File unit bodies to be tabbed are stored on a shelf 135 that is fixed to the frame 16 at a suitable level above the table plate 17, at one side of the peening and punching mechanisms. A similar shelf 136 over the other side of the table can receive the tabbed bodies.

A supply of tabs to be assembled with file unit bodies is stacked at a storage station 35 that is spaced in the forward direction from the peening mechanism 28. During the time that the front guide 20 is beinpropelled rearwardly under the force of the air springs 26, and while the tabbed body is being withdrawn from the machine by the operator, a tab feed slider 36 is being actuated forwardly to a position just in front of the storage station and then rearwardly to push the lowermost tab of the stack from the storage station onto the peening platen 29. The slider 36 remains in its rearward position, with the stack of tabs resting on its top surface, until another tab is needed on the peening platen.

Machine Frame and Table

Figure 4:
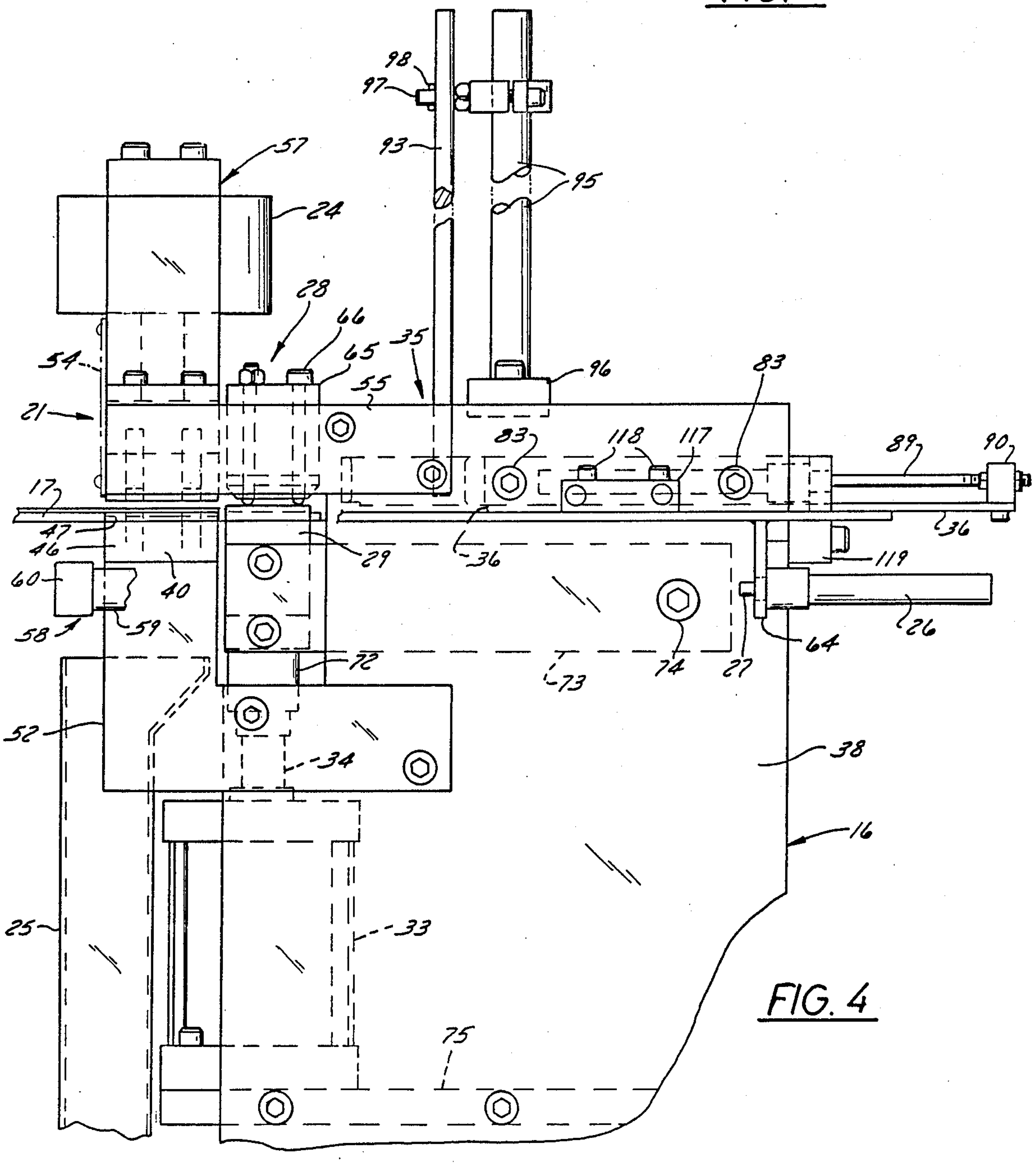
FIG. 4 is a view of the machine in side elevation.
Figure 7:
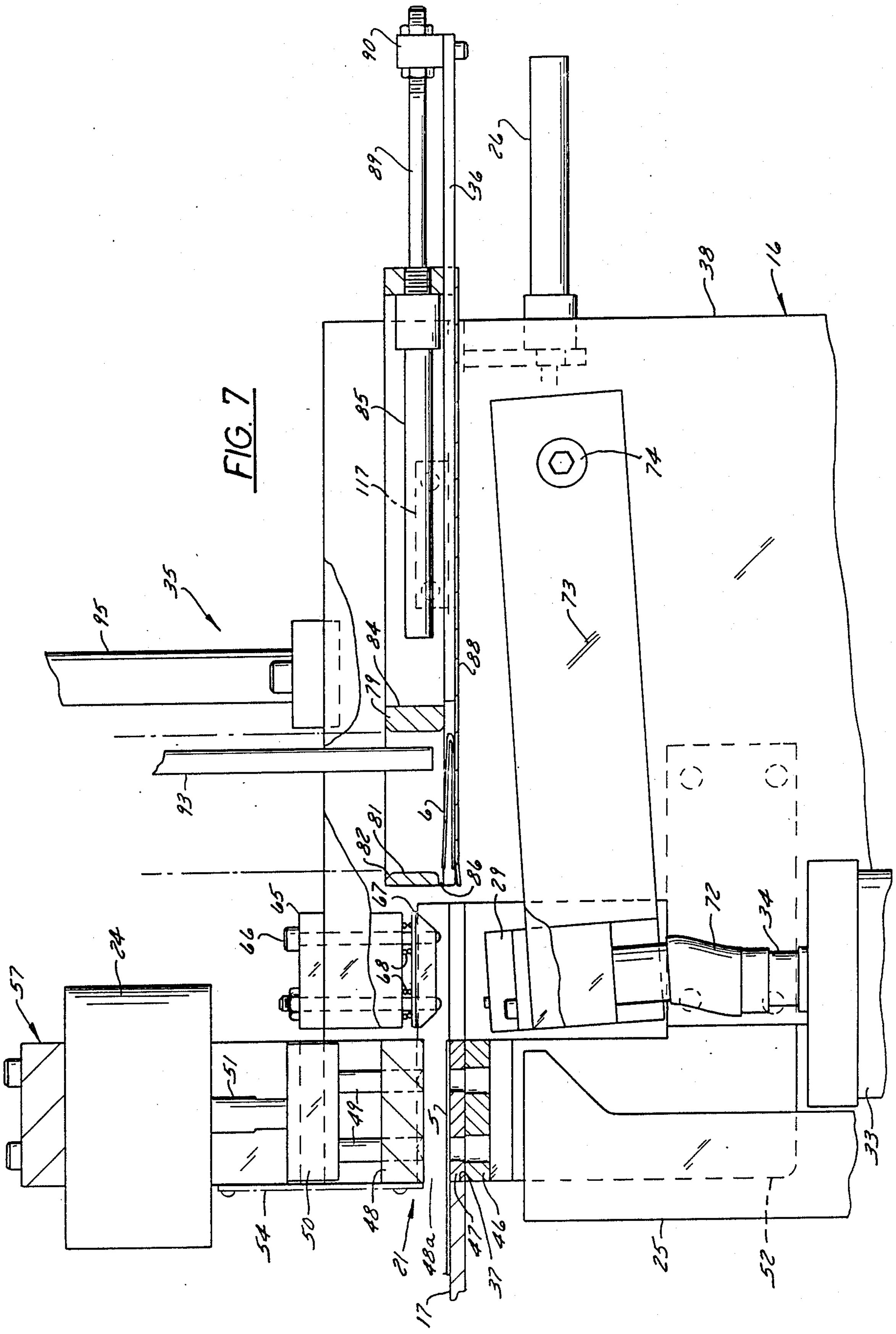
FIG. 7 is a fragmentary view, partly in side elevation and partly in vertical section, showing the punching and peening mechanisms and the tab storage and transport mechanisms.
Figure 8:
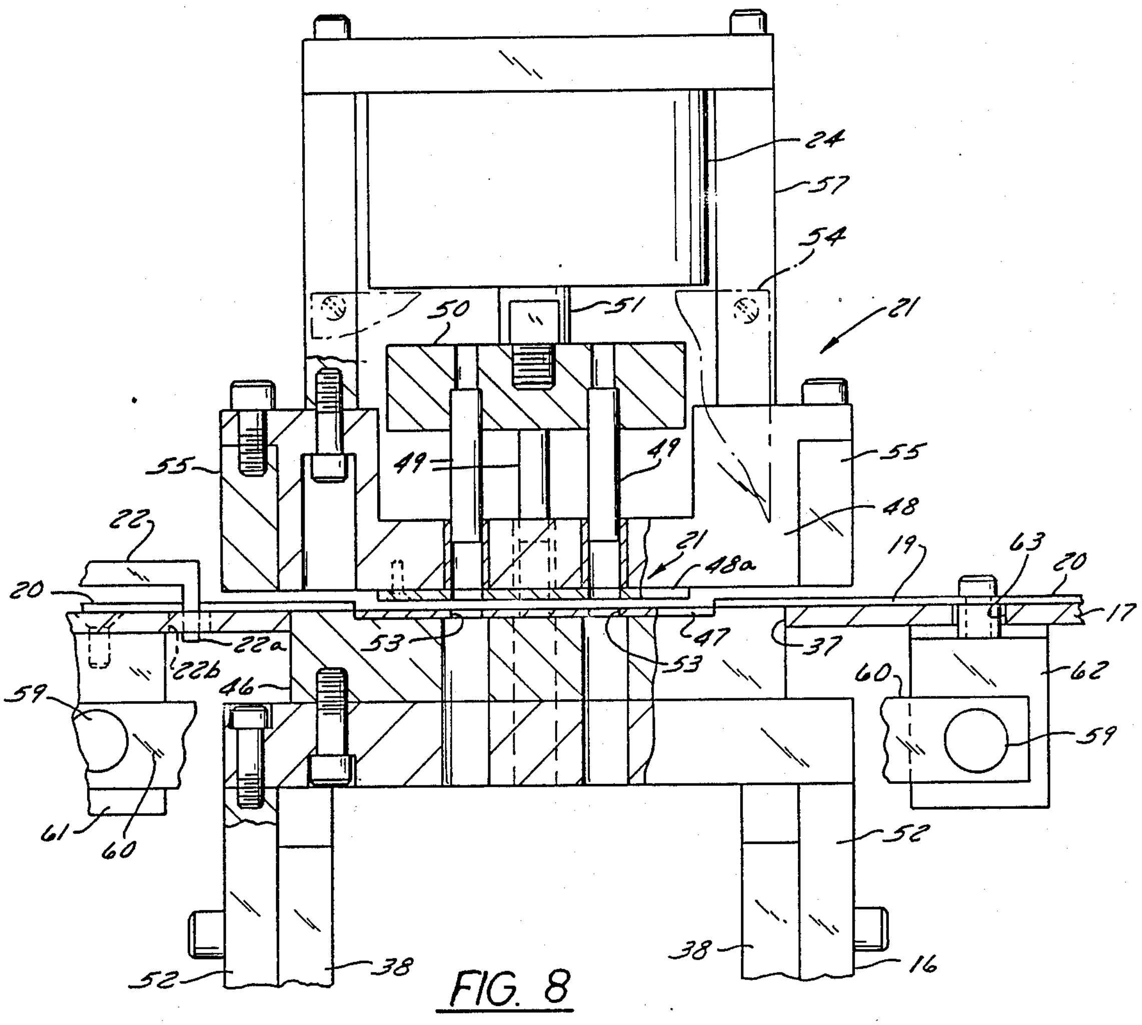
FIG. 8 is a fragmentary view, partly in elevation looking forward and partly in vertical section, showing the punch mechanism in its condition to receive a file unit body.
Figure 9:
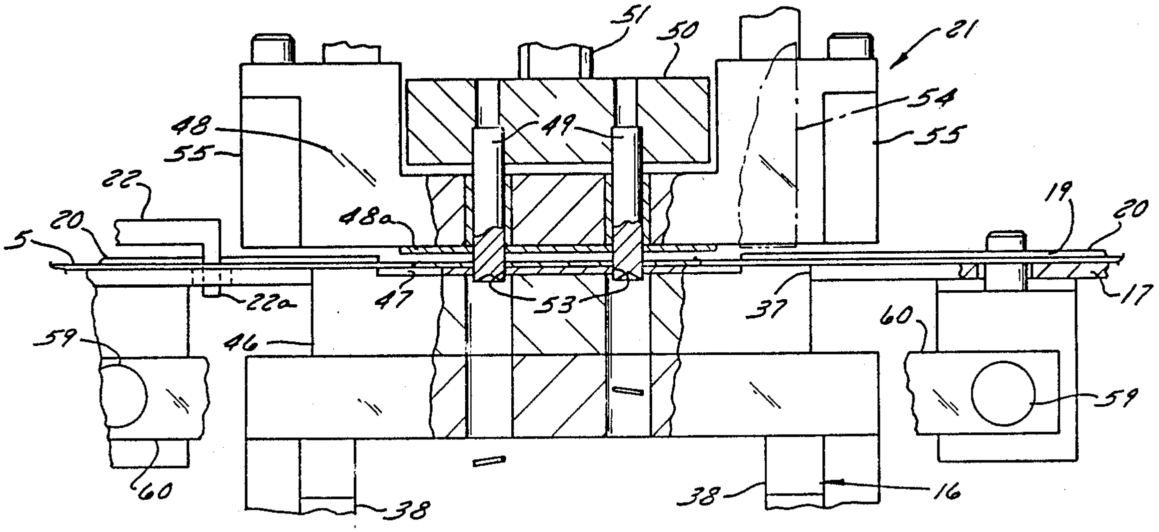
FIG. 9 is a view generally similar to FIG. 8 but showing the punching operation.

Turning now to a more detailed description of the machine structure, the frame 16 comprises a pair of elongated plate-like uprights 38 secured to a suitable base (not shown) in flatwise parallel laterally spaced relationship. They support the table plate 17, which is generally rectangular but has a deep forwardly opening bay or cutout 37 midway between its side edges in which the upright frame members 38 are received and in which are seated the die or anvil element 40 of the punch mechanism 21 and the peening platen 29. The table plate 17 is removably secured to the uprights 38 by means of a supporting block 117 secured to the outer face of each upright and cap screws 118 that extend down through the supporting block and are threaded into the table plate. The table plate is further supported by a long, hard metal beam-like member 119 (FIG. 4) of hard steel which underlies the table plate near its front edge. This member 119 is secured to the front edges of the uprights 38, bridges across them, and extends substantial distances beyond them in both lateral directions. Suitable reinforcing members (not all shown) are preferably secured to the table plate at its underside. One of these is a hard steel reinforcing strip 41 (FIG. 5) that extends along its rear edge.

As seen from the side of the table 17, each side guide 18 is more or less in the shape of a J lying on its side and embracing the rear edge portion of the table. Thus each side guide has a relatively long upper arm 42 that overlies the top surface of the table and extends in the forward and rearward directions and has a shorter arm 43 that underlies the reinforcing strip 41. A clamping screw 44 threaded through the shorter arm 43 clampingly engages the reinforcing strip 41 to secure the side guide in any desired position of adjustment across the width of the table. The position of lateral adjustment of the side guide or side guides determines the location at which a tab will be secured along the tab edge 7 of a file unit body.

Punch Mechanism

The punch mechanism 21 comprises a fixed anvil block 46 that has a hardened die plate 47 overlying its top surface, a fixed punch pin guide block 48 spaced above the die plate 47 and in which punch pins 49 are guided for lengthwise reciprocation, and a punch pin carrier 50 above the guide block 48 that is secured to the piston rod 51 of the punch actuating pneumatic cylinder 24. The punch mechanism anvil block 46 bridges across a pair of rearwardly projecting L-shaped brackets 52 that are secured to the outer side surfaces of the upright frame members 38. The anvil block 46 projects up into the cutout 37 in the table, near the rear edge of that cutout, to have the top surface of the die plate 47 flush with the top surface of the table. Holes 53 in the die plate 47, for closely receiving the punch pins 49, are arranged in a pattern such that the set of eyelets in any commercially standard metal tab can be matched to holes in the die plate. Concentric with each hole 53 in the die plate is a larger diameter hole in the anvil block 46, through which punchings drop down into the funnel-like punchings collector 25.

The punch pin guide block 48 bridges across another pair of rearwardly projecting brackets 55 that are secured to the outer side surfaces of the upright frame members 38. Fixed to its underside is a hard metal stripper plate **48*a*, the bottom surface of which is spaced above the top surface of the punch die plate 47 by a distance such that a file unit body is closely receivable between those two surfaces. The guide block 48 and stripper plate 48*a* have holes that are coaxial with the holes 53 in the die plate 47 and are of a diameter to afford sliding guidance to the punch pins 49, which are secured in the punch pin carrier 50 and project downwardly from it. The punch pin carrier has a detachable securement to the piston rod 51 of the punch mechanism pneumatic cylinder 24 so that the arrangement of the punch pins 49 can be changed whenever there is a change in the type of metal tab to be applied by means of the machine. The pneumatic cylinder 24 of the punch mechanism is mounted between the legs of an inverted U-shaped support 57 that is fixed to side portions of the stripper block 48** and bridges across the punch mechanism.

An upright guard plate 54, secured to the rear surface of the punch pin guide block 48, extends up from the stripper plate **48*a* to the bottom of the cylinder 24** to protect the operator from contact with moving parts of the punch mechanism.

Front Guide

The front guide 20 comprises a pair of rectangular, laterally elongated plate-like members 20', one at each side of the cutout 37 in the table, connected to have aligned rear edge surfaces 19 and to slide forward and rearward in unison on the upper surface of the table plate 17. The rear edge surfaces 19 of these members 20' provide an abutment against which the tab edge of a file unit body engages as it is slid forwardly. A small lug 20*a* fixed to the top surface of each member 20', near its laterally inner edge and projecting rearward beyond its rear edge, overlies the top surface of the body to hold it down flat against the punch mechanism die plate 47.

The connection between the members 20' comprises a U-shaped yoke 58 that underlies the table plate and has its legs 59 projecting forwardly from its laterally extending bight portion 60. Each of the legs 59 of the yoke comprises a shaft that is confined to lengthwise sliding in a pair of bearing blocks 61 that are fixed to the underside of the table plate. To each leg 59 of the yoke, between the bearing blocks 61 that support it, there is secured a connector 62 which projects up through a fore-and-aft extending slot 63 in the table plate and is rigidly secured to its overlying one of the plate-like members 20'. The rearward and forward limits of sliding of the yoke, which establish the positions of the front guide at which a file unit body is at its respective punching and peening locations, are defined by a pair of clamping collars 159 on each leg 59 of the yoke, which serve as adjustable abutments cooperable with the bearing blocks 61 in which the legs 59 are slidingly guided.

The air spring cylinders 26 that control sliding movements of the front guide 20 are mounted in front of the yoke 58, coaxially with its legs 59. Each air spring cylinder 26 is fixed at its rear end to a lug 64 that is secured to and projects downwardly from the beam-like table support member 119, and its piston rod 27 projects rearward through a hole in that lug. The rear ends of the air spring piston rods 27 merely abut the front ends of the respective legs 59 of the yoke so that the air springs need not be mounted in perfect coaxial relation to the yoke legs.

For initiating operation of the punch mechanism as a file unit body comes into engagement with the front guide, an air microswitch 23 is mounted on top of each plate member 20', near its laterally inner end. Each microswitch 23 has a resilient L-shaped actuator 22 that has one leg which extends laterally inwardly over the top surface of the plate member and a downwardly projecting leg 22*a* which is received in a rearwardly opening notch in the rear edge 19 of the plate member and extends into a fore-and-aft extending slot 22*b* in the table plate 17. The leg 22*a* of each actuator, which normally lies in a plane slightly behind the plane of the rear edge surfaces 19, thus extends across the path of the forwardly sliding file unit body and is held in a "switch on" position all during the time that the body remains engaged with the front guide. The slot 22*b* in the table accommodates forward and rearward motion of the actuator 22 with the front guide. Preferably, there are two microswitches 23, one on each of the plate members 20', to ensure that at least one such microswitch will be actuated when a tab is to be fixed very close to a side edge of a body. The two microswitches 23 are of course connected in parallel.

The air microswitch 32 that initiates actuation of the peening cylinder 33 is mounted on the beam-like member 119 that underlies the table plate near its rear edge. The actuator arm 32*a* of that microswitch is positioned to be engaged by the front end of one of the shaft-like legs 59 of the yoke as the front guide moves into its front or peening position, those legs being substantially larger in diameter than the air cylinder piston rods 27 which also engage their front ends.

As explained hereinafter, there is a short delay between the time the peening cylinder 33 completes its cycle and the instant when the air springs 26 begin to effect rearward movement of the front guide. This delay enables the operator to withdraw a tabbed unit from the machine without danger that the forwardly moving air microswitches 23 will overtake the body and be reactuated by it to initiate a punching cycle that would leave undesired holes in the body.

Peening Mechanism

The platen 29 of the peening mechanism 28, on which a tab rests while a file unit body is moved forward into assembled relationship to it, is carried for limited up and down movement as explained hereinafter. Above it is mounted a fixed peening pin carrier block 65 which bridges across the top edges of the upright frame members 38 and is detachably secured to them as by means of cap screws 66. A stripper plate 67 is supported beneath the block 65 on shoulder screws (not shown) which are threaded up into that block near its opposite sides and which guide the stripper plate 67 for flatwise up and down motion through a limited distance. Resilient washers 68 surrounding the shoulder screws react between the block 65 and the stripper plate 67 to bias the latter down to a normal position. Tapped holes in the carrier block 65, arranged in the same pattern as the holes 53 in the punch mechanism die plate, receive the threaded upper shank portions of peening pins 70 to removably secure those pins in the block 65. The peening pins 70 project downwardly through holes in the stripper plate 67. The bottom ends of the peening pins 70 are spaced above the level of the top surface of the table plate 17 so that they do not interfere with movement of a tab onto the platen 29, and the bottom surface of the stripper plate 67 is normally flush with, or a little below, the bottom ends of those pins.

The peening platen 29 is carried on the rear end portions of a pair of horizontally elongated swingable arms 73 which have near their front ends coaxial pivotal connections 74 to the upright frame members 38 and which overlie the outer surfaces of those uprights. The peening platen 29, which is relatively thick and block-like, bridges across the two swingable arms 73 and is rigidly secured to them, to be carried by them for limited up and down motion. The outer end portions of the arms 73 lie in the corner defined by the L-shaped brackets 52. The pneumatic cylinder 33 that imparts up and down motion to the platen 29 is mounted between the uprights 38 on a fixed shelf-like support 75 that bridges across them. It is preferably a three-stage cylinder of known type that provides a high force with a relatively short stroke length but has a reasonably small diameter. Its piston rod 34 is connected with the peening platen 29 by means of a flexible connector 72 that accommodates the swinging motion of the arms 73. The connection comprising the connector 72 is a threaded one that provides for adjustment of the lowered position of the peening platen 29, which is attained at full retraction of the peening cylinder piston rod 34.

Figure 10:
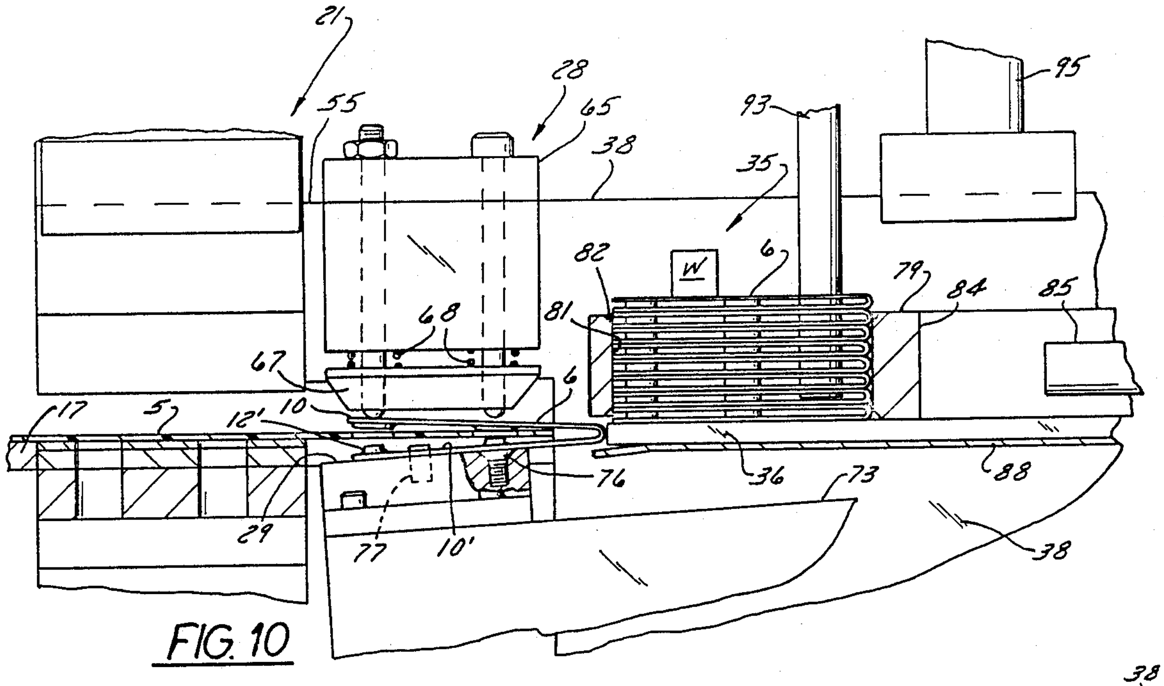
FIG. 10 is a fragmentary view, mainly in vertical section on a fore-and-aft extending plane, showing portions of the machine in the conditions existing at the moment when a file unit body is preliminarily assembled with a tab.
Figure 10A:
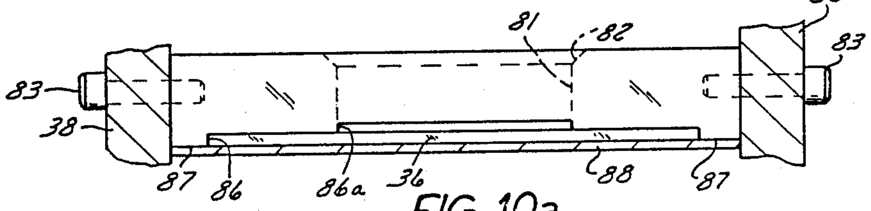
FIG. 10*a* is a detail view in vertical section through the feeder body, near the rear end thereof.
Figure 11:
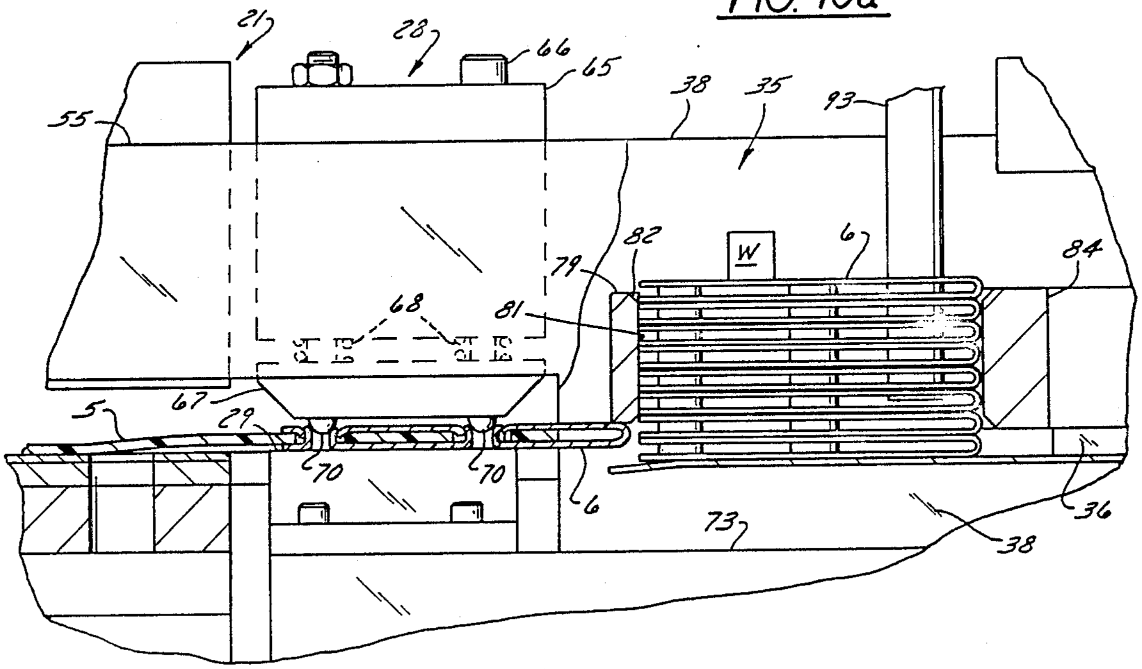
FIG. 11 is a view generally similar to FIG. 10 but showing the peening operation.
Figure 12:
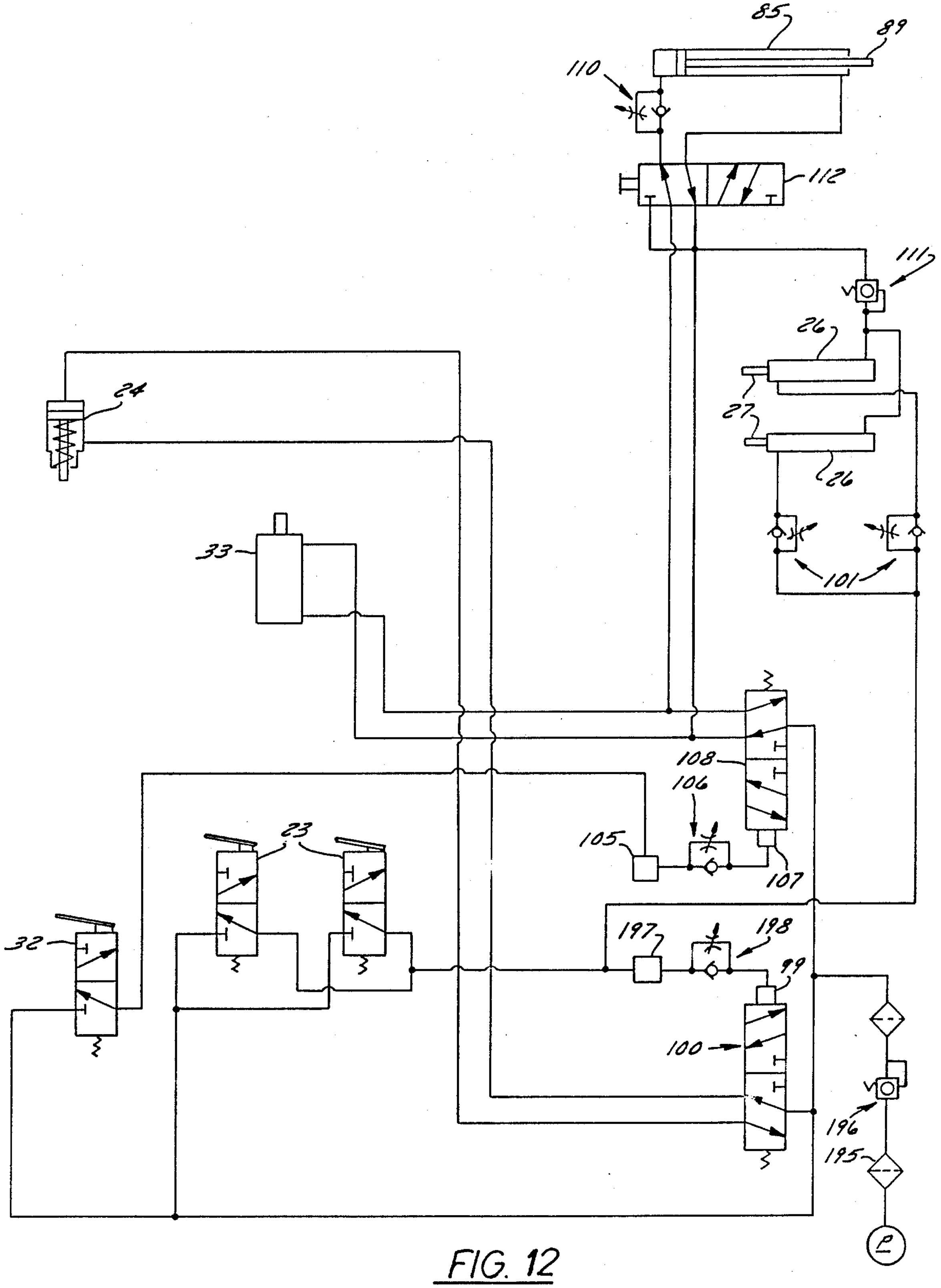
FIG. 12 is a diagram of the pneumatic circuit.

In the lowered position (FIG. 10) of the platen 29 its top surface is spaced below the level of the top surface of the table plate 17 by a distance such that a tab resting on the platen will have its wings at the proper elevations for receiving between them a file unit body 5 that is sliding forwardly on the table plate. To ensure that the lower wing 10' of such a tab will have good flatwise engagement with the top surface of the platen 29, a small permanent magnet 76 is embedded in the platen with its pole faces flush with its top surface. A pair of small studs 77 project above the top surface of the platen, near its rear edge, to provide abutments which are engaged by the rear edge of a lower tab wing 10' as the tab is moved into the peening station. These studs 77 thus cooperate with the magnet 76 to so position the tab that its eyelets will be accurately engaged by the peening pins 70 as the platen is raised by the peening cylinder 33. For its cooperation with the peening pins, the platen has hardened die inserts that are flush with its top surface and are arranged in a pattern corresponding to that of the peening pin holes in the carrier block 65.

It will be observed that the lower wing 10' of a tab resting on the platen is the one that has the rivet eyelets 12', and the tab has its folded edge forward. Because of the swinging of the arms 73, the platen in its lowered position has its top surface inclined rearwardly and downwardly so that the slightly divergent wings of the unpeened tab fit nicely between that surface and the horizontal underside of the stripper plate 67. As the platen 29 is moved up in its peening stroke, it cooperates with the stripper plate to converge the tab wings into firm flatwise engagement with the opposite surfaces of a file unit body. After such engagement has been effected the platen continues its upward motion, raising the stripper plate 67 against the downward bias thereon and thus bringing the peening pins 70 into peening engagement with the rivet eyelets 12' of the tab.

Tab Storage Station and Tab Transport

Tabs to be applied to file unit bodies are stored in a stack at the tab storage station 35, which is just in front of the peening mechanism 28. At the storage station a horizontally extending feeder body 79 is detachably secured between the upright frame members 38, at a small distance below their top edges. This feeder body 79 has a substantial vertical thickness, equal to the height of, e.g., ten or twelve stacked tabs. Laterally it extends across the entire distance between the uprights 38, and it has a substantial length in the fore-and-aft direction. A hole or well 81 that extends vertically through the feeder body near its rear end is shaped, as seen from above, in correspondence with the shape of tabs to be applied. The tabs of the stack are guided in the final stages of their downward motion by the vertical surfaces of this well 81 and by a chamfer 82 around its upper edge. Since the well 81 must match the particular tabs being applied, a number of different feeder bodies should be available for interchangeable use, and the feeder body in use is readily removably secured to the uprights 38 by means of cap screws 83 that extend through those uprights and are threaded into sidewardly opening tapped holes in the feeder body.

In front of the well 81 the feeder body has an elongated hole or cutout 84 in which is mounted a pneumatic cylinder 85 for actuating the tab feed slider 36 in its backward and forward motion.

At its bottom the feeder body 79 has a wide but vertically shallow downwardly opening groove 86 that extends along its entire length and defines a downwardly projecting ridge 87 along each of its sides. Secured to the undersides of these ridges 87 and bridging across the groove 86 is a bottom plate 88 that underlies the feeder body along its full length and provides a supporting surface for the tab feed slider 36 and upon which the lowermost tab of the stack slides out of the well 81 as it is pushed rearward by the feed slider. The groove 86 is wider than the well 81, but its vertical depth is somewhat less than the thickness of a tab, and therefore the underside of the feeder body has a shallow relief groove **86*a* that extends between its rear end and the well 81. This relief groove is of such a width that its side surfaces guidingly confine the lowermost tab of the stack to translatory motion as it moves out of the well 81. Although the wings of a free tab are slightly spread or divergent, the wings of the lowermost tab in a stack are pressed together by the weight of the tabs above it, possibly aided by a small weight W at the top of the stack. The outlet from the well 81 that is defined by the relief groove 86*a*** is of such vertical depth that only the lowermost tab in the stack, with its wings converged, can pass through it.

The tab feed slider 36 comprises an elongated rectangular plate that slides flatwise on the bottom plate 88 between the ridges 87 on the feeder body, which guidingly confine it to backward and forward motion. The piston rod 89 of the slider actuating cylinder 85, which projects forwardly from that cylinder, is secured at its front end to an upwardly projecting cleat 90 on the slider plate that extends along its front edge. The cylinder 85 is secured at its rod end to the front portion of the feeder body, in which there is a hole through which the piston rod 89 extends. Rearward motion of the slider plate 36 must terminate at a defined limit at which a tab pushed rearward from the storage station is accurately positioned on the peening platen 29, and that limit is established by adjustable abutment screws 91 on the cleat 90 that engage bumpers 92 on the front of the feeder body.

Tabs in the stack that are above the level of the feeder body 79 are maintained in stacked relationship by an upright guide shaft 93 which is supported from its upper end and which has its lower end spaced above the bottom plate 88 by a distance to be clear of the tab feed slider 36 and also clear of the lowermost tab in the stack when the slider 36 is at its forward limit of travel and the stack is resting on the bottom plate 88. The guide shaft 93 can be solid or can be made of relatively thin metal bent to a U-shaped cross-section, but its cross-section profile will in any case be such that it can be closely but slidably received in the window slots 11 of the tabs of the stack. The means for supporting the guide shaft comprises a post 95 that projects up from a transverse base member 96 which bridges across the upper edges of the upright frame members 38 at a small distance forward from the storage station. Near the top of the post 95 is a rearwardly projecting pin 97 that passes through a hole in the guide shaft 93 near the upper end thereof. A spring clip 98 or the like, inserted through a hole in the pin 97, confines the guide shaft 93 against displacement off of that pin.

Pneumatic Circuitry

The pneumatic system comprises a filter 195 and a pressure regulator 196 which are housed, along with the valves of the system, in a suitable cabinet (not shown) that is mounted below the table plate 17 on one of the upright frame members 38.

The filter and pressure regulator are connected in series with a source P of pressure air that is external to the machine.

Upon actuation of one or both of the parallel-connected air microswitches 23 that are mounted on the front guide 20, pressure air flows to a signal valve 197 that is connected in series with a flow control valve 198 and the pilot chamber 99 of a pilot-operated spool valve 100. The signal valve 197 is normally closed, but it opens when air flow to it reaches a predetermined minimum pressure value, and then it recloses. It thus delivers a pulse of pressure air through the flow control valve 198 to the pilot chamber 99 whereby the spool of the spool valve 100 is shifted to its actuated position in which pressure air from the source P is delivered to the blind end of the punch cylinder 24 and the rod end of that cylinder is vented, so that the punch is driven downward in its punching stroke. The flow control valve 198 passes pressure air freely into the pilot chamber 99 but provides for throttled venting of that chamber to delay return of the spool of spool valve 100 to its normal position. This delay ensures that the punch will move through its full punching stroke.

In the normal condition of the spool valve 100 the rod end of the punch cylinder 24 is connected with the pressure air source P and the punch rises in its return stroke and is maintained in its raised position until the spool of the spool valve 100 is shifted again.

Through the cycle of operation of the punch mechanism and the subsequent cycle of the peening mechanism, the air microswitches 23 remain open under the forward bias that the operator maintains on the file unit body. Upon closure of the signal valve 197, pressure air flowing towards it from the microswitches 23 is diverted through parallel-connected flow control valves 101 to the rod ends of the air spring cylinders 26. There is a flow control valve 101 for each air spring cylinder 26, and the purpose of these flow control valves is to slow the rise in pressure in the rod ends of those cylinders. The air spring piston rods 27 cannot begin to retract until pressure in the rod ends of the air spring cylinders 26 exceeds a predetermined pressure constantly maintained in their blind ends, as explained hereinafter. Thus retraction of the air spring piston rods 27, and consequent forward shifting of the front edge guide 20, is delayed until the punch mechanism has completed its cycle.

As the front guide 20 reaches the forward limit of its travel, it actuates the air microswitch 32 that controls the peening cylinder 33. Pressure air from the microswitch 32 is delivered through a signal valve 105 and a flow control valve 106 to the pilot chamber 107 of a spool valve 108. As with the spool valve 100, the spool of the valve 108 is shifted out of its normal position to its actuated position in which it connects the pressure air source P with the blind end of the peening cylinder 33 and vents the rod end of that cylinder; and then, after a sufficient delay to ensure that the peening stroke has been completed, the spool of the valve 108 shifts back to its normal position in which the connections to the peening cylinder 33 are reversed for the return stroke of the peening mechanism.

In parallel with the connection to the blind end of the peening cylinder 33, there is a connection to the blind end of the tab feeder cylinder 85 through a flow control valve 110. Hence, during the interval when the spool of the valve 108 is in its actuated position, pressure air is delivered both to the blind end of the peening cylinder 33 and, through the flow control valve 110, to the blind end of the tab feeder cylinder 85. As with the air spring cylinders, the rod end of the tab feeder cylinder 85 is normally pressurized to a predetermined value, and the flow control valve 110 slows the pressure rise in the blind end of that cylinder 85 to delay extension of its piston rod 89 until the peening mechanism has completed its return stroke.

In parallel with the connection to the rod end of the peening cylinder 33 is a branched connection to the blind ends of the air spring cylinders 26 and to the rod end of the tab feeder cylinder 85. Thus pressure air flows into this branched connection whenever the spool valve 108 is in its normal condition. A pressure regulator 111 in this branched connection maintains the above mentioned predetermined pressure in the blind ends of the air spring cylinders and the rod end of the tab feeder cylinder. The flow control valves 110 permit pressure air to bleed out of the rod ends of the air spring cylinders 26 after retraction of their rods, and the flow control valve 110 similarly permits pressure air to bleed out of the blind end of the tab feeder cylinder 85 after extension of its rod.

Occasionally the stack of tabs at the tab storage station may fail to drop all the way down onto the bottom plate 88 when the tab feed slider 36 cycles, and the slider then fails to deliver a tab to the peening platen. To provide for manually recycling the tab feeder in such cases, a manually actuatable spool valve 112 is connected across the ports of the tab feeder cylinder 85. Shifting the spool of that valve 112 to its actuated position provides for venting of the rod end of the tab feeder cylinder 85 while air at the pressure maintained by the regulator 111 is charged into the blind end of that cylinder 85 through the flow control valve 110. This causes the tab feeder piston rod 89 to extend. The operator can return the spool of the valve 112 to its normal position almost immediately, whereupon the piston rod 89 will retract in the normal manner.

From the foregoing description taken with the accompanying drawings, it will be apparent that this invention provides a very compact, efficient and inexpensive semi-automatic machine for applying metal tabs to file unit bodies and that the machine of this invention is versatile, safe for the operator, simple, and reliable in operation with a minimum of maintenance.

What is claimed as the invention is:

1. Apparatus for securing metal indicia tabs to file unit bodies of pressboard or the like, each said body having a tab edge at which a tab is to be secured and other edges that extend transversely to the tab edge, and each said tab being bent substantially to a U-shape to have a bright portion which defines a folded edge of the tab and a pair of eyeletted wings extending from said bight portion that are adapted to flatwise overlie opposite surfaces of a file unit body and to be secured thereto by peening of their eyelets through rivet holes in the body, said apparatus comprising:

A. a stationary frame;

B. a table on said frame (1) having an upper surface for flatwise slidable support of a file unit body and (2) having a rear edge;

C. a punching mechanism on said frame at a punching station spaced in a forward direction from said rear edge of the table, for punching rivet holes through a file unit body on said table;

D. a peening mechanism on said frame at a peening station spaced in said forward direction from said punching station, said peening mechanism comprising
  (1) a peening platen
    (a) having a top surface for supporting a tab and which is flatwise overlain by a lower wing of a supported tab, and
    (b) tab locator means comprising abutments engageable by edge portions of a tab on said top surface for positioning the tab with its folded edge facing in said forward direction,
  (2) peening pins fixed above said peening platen and
  (3) means for actuating said peening platen between
    (a) a lowered position wherein a tab positioned thereon has its lower wing below the level of said upper surface of the table and its upper wing above that level, and
    (b) a raised position wherein the platen cooperates with said peening pins for peening the eyelets of a tab on the platen; and E. guide means on said frame for positioning a file unit body on said table that is urged for sliding in said forward direction with its tab edge forward, said guide means comprising
  (1) a side guide projecting above said upper surface of the table for sliding engagement by one of said other edges of the body, and
  (2) a front guide comprising a movable element engageable by the tab edge of the body for establishing the body successively
    (a) at a punching location wherein a portion of the body adjacent to said tab edge is at said punching station, and
    (b) at a peening location wherein said portion of the body is at said peening station and is received between the wings of a tab on said platen with the latter in its lowered position.

2. The apparatus of claim 1, further characterized by:

F. means on said frame defining a tab supporting surface which extends from said peening station through a tab storage station that is spaced in said forward direction from the peening station;

G. an upright tab storage guide on said frame, at said storage station, for maintaining a plurality of tabs in stacked relationship with a lowermost one of them resting on said supporting surface and with each tab in the stack having its wings extending substantially horizontally and its folded edge facing in said forward direction, said tab storage guide
  (1) having a bottom edge which is spaced above said tab supporting surface by a distance to be clear of said lowermost tab and
  (2) being arranged to engage edge portions of all tabs above said lowermost tab to confine them to downward translatory motion; and H. a tab pusher movable on said frame alternately in said forward direction and in an opposite rearward direction, said tab pusher having an abutment thereon which faces in said rearward direction and which, during its rearward motion, engages the folded edge of the lowermost tab at said storage station to push that tab onto said peening platen.

3. The apparatus of claim 1 wherein said movable element of the guide means comprises:
  (1) a plate slidingly overlying said upper surface of the table and having an edge surface which faces in a rearward direction opposite to said forward direction and which is engageable by the tab edge of a file unit body on the table;
  (2) means on the frame confining said plate to sliding in said forward and rearward directions between defined forward and rearward limits; and
  (3) means reacting between the frame and said plate for urging the latter to its said rearward limit.

4. Apparatus for securing metal indicia tabs to file unit bodies of pressboard or the like, each said body having a tab edge at which a tab is to be secured and other edges that extend transversely to the tab edge, and each said tab being bent substantially to a U-shape to have a bight portion which defines a folded edge of the tab and a pair of eyeletted wings extending from said bight portion that are adapted to flatwise overlie opposite surfaces of a file unit body and to be secured thereto by peening of their eyelets, said apparatus comprising:

A. relatively stationary means comprising a frame and defining
  (1) an upwardly facing table surface for flatwise slidable support of a file unit body, said table surface having a rear edge,
  (2) a peening station which is spaced in a forward direction from said rear edge and at which there are downwardly projecting eyelet peening pins at a level above that of said table surface,
  (3) a tab storage station spaced in said forward direction from said peening station, and
  (4) an upwardly facing tab supporting surface extending in said forward direction from said peening station through said storage station;

B. guide means projecting above the level of said table surface and engageable by the tab edge and at least one of said other edges of a file unit body on said table surface for guiding that body in forward sliding motion to a location in which a portion of that body adjacent to its tab edge is at said peening station;

C. an upright tab storage guide on said frame, at said storage station, for holding a plurality of tabs in a stacked relationship with the wings of each tab extending substantially horizontally, the folded edge of said tab facing in said forward direction and a lowermost tab of the stack resting on said tab supporting surface, said tab storage guide
  (1) being spaced above said tab- supporting surface by a distance to be clear of said lowermost tab and
  (2) being arranged to engage edge portions of all tabs above said lowermost tab for confining them to downward translation;

D. a tab pusher slidable on said tab supporting surface in said forward direction and in an opposite rearward direction, said tab pusher having a height to pass under said tab storage guide and having a rearwardly facing abutment engageable against the folded edge of said lowermost tab for displacing that tab from the storage station to the peening station upon movement of said pusher in said rearward direction;

E. a peening platen at said peening station (1) having a top surface for supporting a tab at said peening station and which is flatwise overlain by a lower wing of that tab and (2) having stop means projecting above said top surface and cooperable with edge portions of a tab thereon to position it with its eyelets in alignment with said peening pins; and F. means for actuating said peening platen in substantially up and down motion between (1) a lower limit in which said top surface of the peening platen is below the level of said table surface and said portion of a file unit body at said location is between the wings of a tab thereon, and (2) an upper limit in which said top surface is above said level and the peening platen cooperates with said peening pins for eyelet peening.

5. The apparatus of claim 4, further characterized by:

(1) punching means on said frame, at a punching station spaced in said rearward direction from said peening station and spaced in said forward direction from the rear edge of said table surface, for punching rivet holes in a file unit body through which tab eyelets are peened; and (2) said guide means comprising (a) a side guide projecting above said table surface for sliding engagement by said one other edge of a file unit body on said table surface, and (b) a front guide comprising a movable element engageable by the tab edge of the body as the body is biased for forward sliding on the table surface, for establishing the body successively (i) at a punching location wherein a portion of the body adjacent to its tab edge is at said punching station and (ii) at a peening location wherein said portion of the body is at said peening station.

6. Apparatus for securing a metal tab to a flat file unit body that has a tab edge at which the tab is to be secured and a pair of side edges transverse to said tab edge, said tab being bent to substantially a U-shape to have a bight portion which defines a folded edge of the tab and a pair of eyeletted wings extending from said bight portion that are adapted to flatwise overlie opposite surfaces of the body and to be secured thereto by peening of their eyelets through rivet holes in the body, said apparatus comprising:

A. supporting means providing a flat upwardly facing table surface upon which a file guide body is flatwise supportable for edgewise sliding and which has a rear edge;

B. side guide means on said supporting means, engageable by a side edge of a file unit body on said table surface to guide it for sliding in a forward direction away from said rear edge and with its tab edge leading;

C. punching means carried by said supporting means at a punching station spaced in said forward direction from said rear edge, for punching rivet holes through a portion of a file unit body adjacent to its tab edge, said punching means comprising a punch member that is vertically reciprocable relative to said supporting means;

D. front guide means on said supporting means, engageable by the tab edge of a file guide body on said table surface that is urged in said forward direction to define for the body (1) a punching location at which said portion of the body is at said punching station and (2) a peening location at which said portion of the body is at a peening station that is spaced in the forward direction from said punching station, said front guide means comprising an element which has a rearwardly facing abutment surface for engagement by said tab edge and which is movable relative to said supporting means for permitting the forwardly urged body to slide from said punching location to said peening location;

E. eyelet peening means at said peening station comprising (1) downwardly projecting peening pins that are stationary on said supporting means, and (2) a peening platen beneath said peening pins, movable up and down relative- to the supporting means for cooperation with said peening pins and having an upwardly facing platen surface which is at a level below that of said table surface when the platen is in a defined lowered position;

F. tab supporting means on said supporting means providing an upwardly facing tab supporting surface that extends from said peening station through a tab storage station spaced in said forward direction from the peening station;

G. an upright tab storage guide on said supporting means, at said storage station, for maintaining a plurality of tabs in stacked relationship with a lowermost one of them resting on said tab supporting surface and with each tab in the stack having its wings extending substantially horizontally and its folded edge facing in said forward direction, said tab storage guide (1) having a bottom edge which is spaced above said tab supporting surface by a distance to be clear of said lowermost tab and (2) being arranged to engage edge portions of all tabs above said lowermost tab to confine them to downward translatory motion; and H. a tab pusher movable on said supporting means alternately in said forward direction and in an opposite rearward direction, said tab pusher having an abutment surface thereon which faces in said rearward direction and which, during its rearward motion, engages the lowermost tab at said storage station to push that tab onto said platen surface.

* * * * *